US010792775B2

(12) United States Patent
Wurm

(10) Patent No.: US 10,792,775 B2
(45) Date of Patent: Oct. 6, 2020

(54) METHOD AND MACHINING DEVICE FOR CLAMPING AND MACHINING AN ELECTRICAL ENCLOSURE COMPONENT

(71) Applicant: RITTAL GMBH & CO. KG, Herborn (DE)

(72) Inventor: Kersten Wurm, Dietzenbach (DE)

(73) Assignee: RITTAL GMBH & CO. KG, Herborn (DE)

( * ) Notice: Subject to any disclaimer, the term of this patent is extended or adjusted under 35 U.S.C. 154(b) by 224 days.

(21) Appl. No.: 15/572,446

(22) PCT Filed: May 4, 2016

(86) PCT No.: PCT/DE2016/100202
§ 371 (c)(1),
(2) Date: Nov. 7, 2017

(87) PCT Pub. No.: WO2016/180401
PCT Pub. Date: Nov. 17, 2016

(65) Prior Publication Data
US 2018/0147677 A1 May 31, 2018

(30) Foreign Application Priority Data

May 8, 2015 (DE) .......................... 10 2015 107 249

(51) Int. Cl.
*B23Q 3/06* (2006.01)
*B25B 5/04* (2006.01)
(Continued)

(52) U.S. Cl.
CPC ................ *B23Q 3/062* (2013.01); *B25B 5/04* (2013.01); *B25B 5/06* (2013.01); *B23K 37/0408* (2013.01);
(Continued)

(58) Field of Classification Search
CPC ................ B23Q 3/062; B23Q 2703/10; B23Q 2240/002; B23K 37/0408; B25B 5/04; B25B 5/06
(Continued)

(56) References Cited

U.S. PATENT DOCUMENTS 9,833,866 B2 * 12/2017 Yonezawa ............... B25B 5/064
2017/0229797 A1 8/2017 Wurm et al.
2017/0259386 A1 9/2017 Kienholz et al.

FOREIGN PATENT DOCUMENTS

| DE | 2434026 A1 | 2/1976 |
| EP | 2842686 A1 | 3/2015 |
| IT | FI20090250 A1 | 5/2011 |

OTHER PUBLICATIONS

Machine Translation for Hofmann, DE2434026 (Year: 1974).*
(Continued)

*Primary Examiner* — Christopher J Besler
*Assistant Examiner* — Christine Bersabal
(74) *Attorney, Agent, or Firm* — Harness, Dickey & Pierce, P.L.C.

(57) ABSTRACT

The invention relates to a method and machining device for clamping and machining a control cabinet component in a machining device. The method includes the following steps: Arranging a workpiece configured as a control cabinet component on a work surface of a machining device; clamping the workpiece on the work surface, wherein a supporting unit with at least one clamping device arranged on it, is shifted to an edge of the workpiece using an actuator-driven shifting unit and a clamping element of the at least one clamping device is shifted from a released position to a clamped position when guided towards the edge of the workpiece, meaning that the clamping element comes to rest at multiple contact points on the workpiece so that the clamping element secures the workpiece in a
(Continued)

Figure 1:
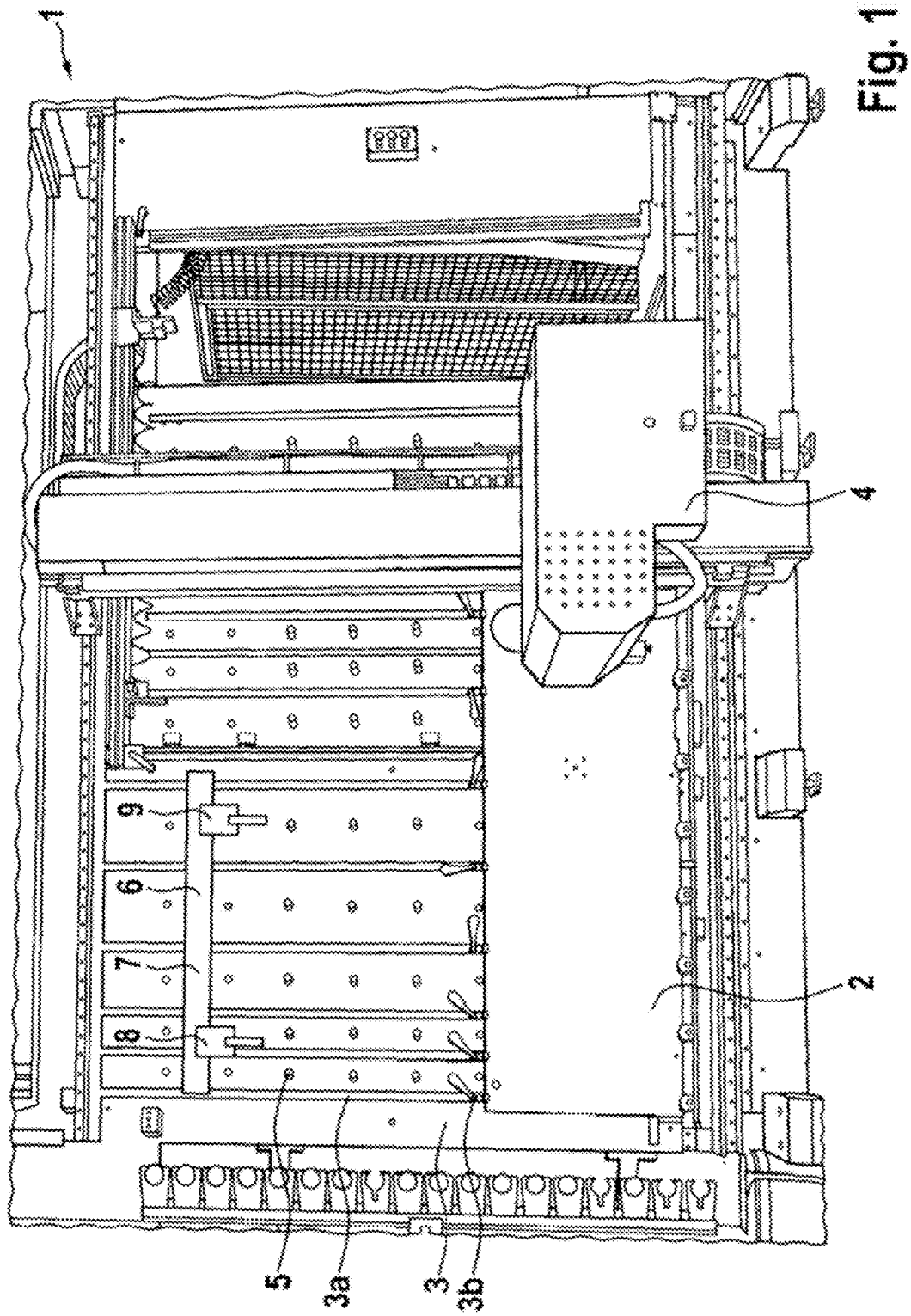

machining position, preventing it from shifting perpendicularly to the work surface, and machining the workpiece using a machining tool.

10 Claims, 6 Drawing Sheets

(51) Int. Cl.
    *B25B 5/06*     (2006.01)
    *B23K 37/04*     (2006.01)

(52) U.S. Cl.
    CPC .... *B23Q 2240/002* (2013.01); *B23Q 2703/10* (2013.01)

(58) Field of Classification Search
    USPC .......................................... 269/148, 249, 266
    See application file for complete search history.

(56) References Cited

OTHER PUBLICATIONS

International Search Report (in English and German) and Written Opinion (in German) of the International Searching Authority issued in PCT/DE2016/100202, dated Sep. 21, 2016, ISA/EPO.

\* cited by examiner

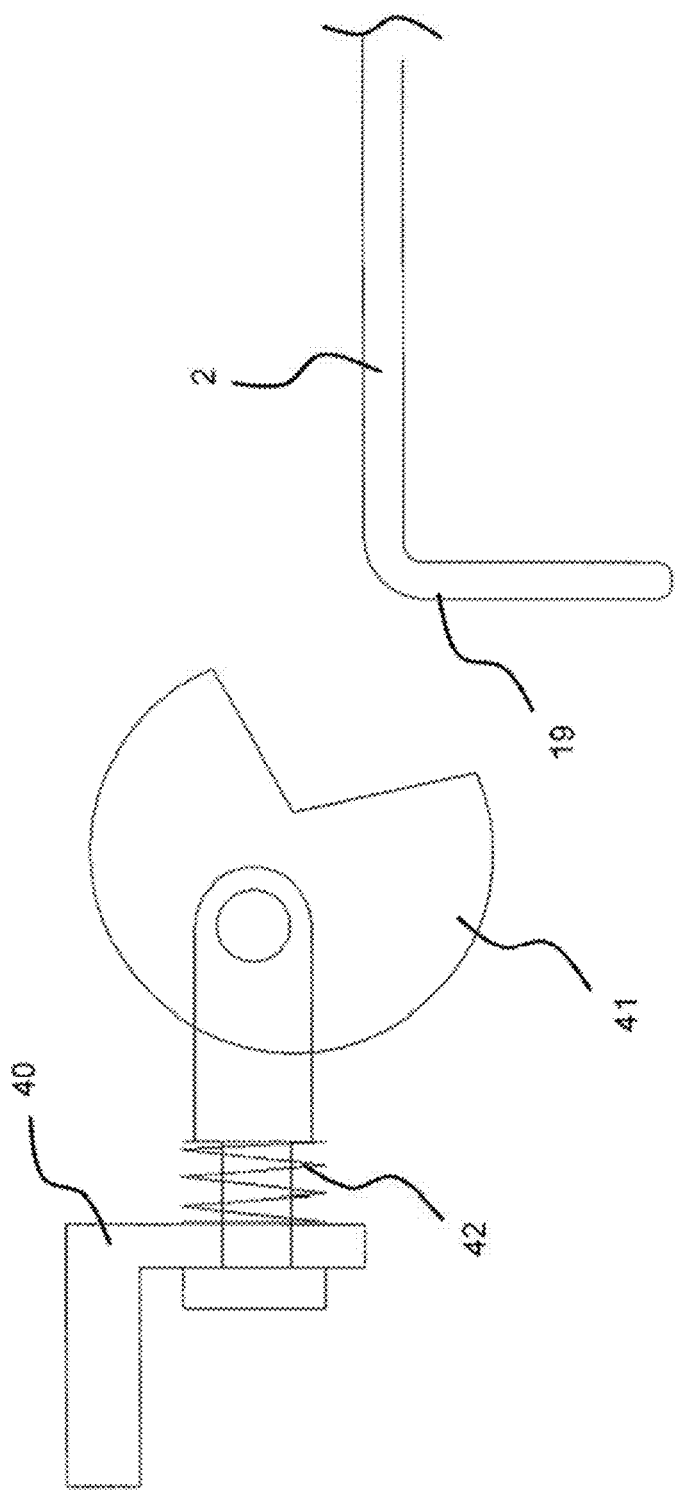

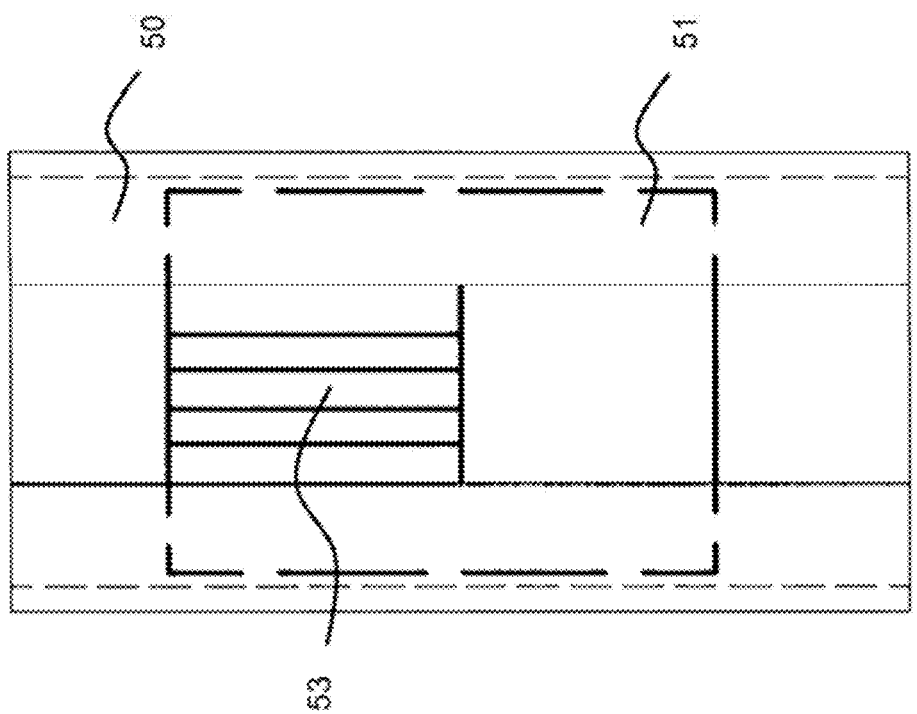

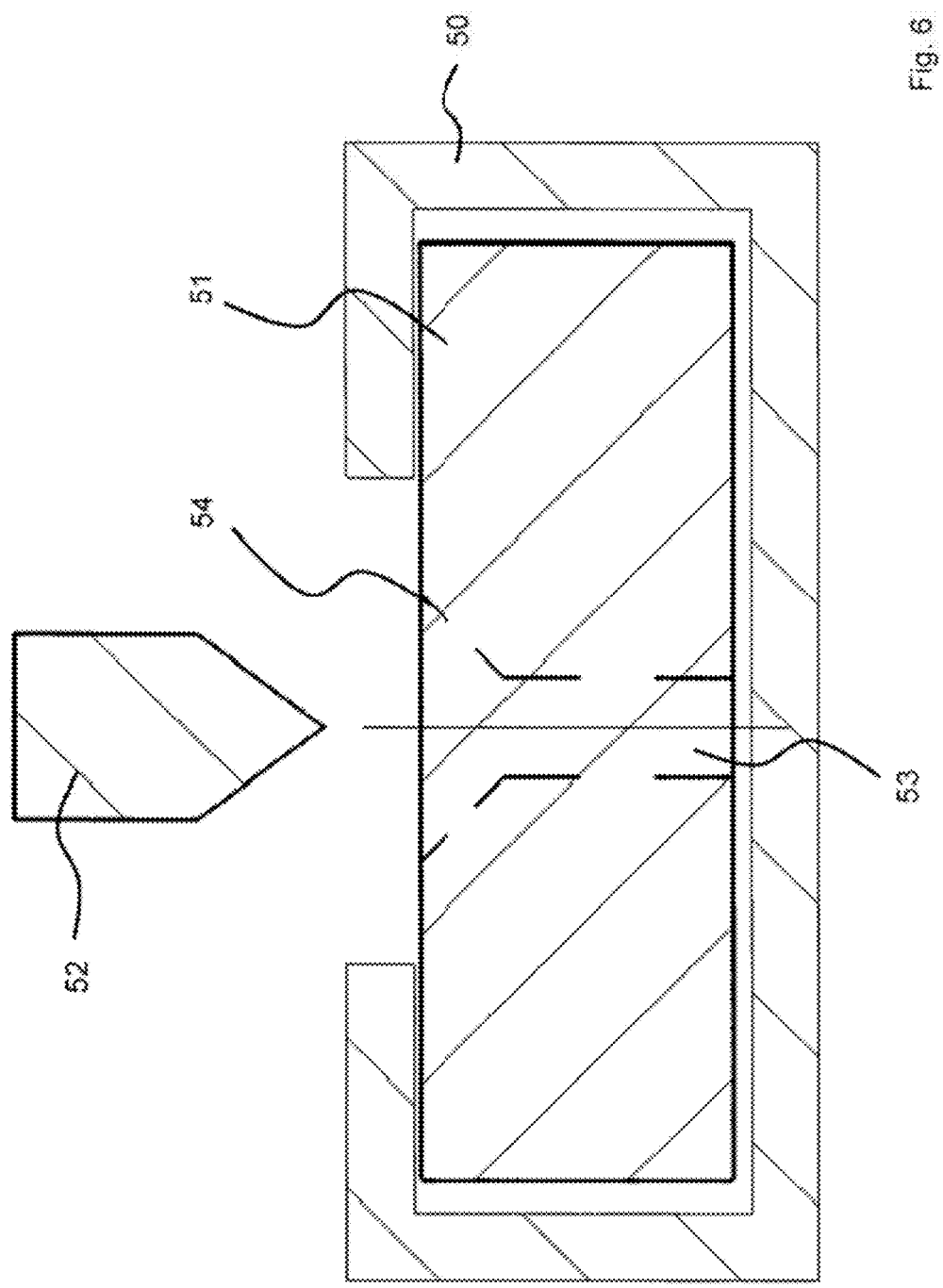

METHOD AND MACHINING DEVICE FOR CLAMPING AND MACHINING AN ELECTRICAL ENCLOSURE COMPONENT

CROSS-REFERENCE TO RELATED APPLICATIONS

This application is a 371 U.S. National Stage of International Application No. PCT/DE2016/100202, filed on May 4, 2016, which claims priority to German Application 10 2015 107 249.1, filed on May 8, 2015. The entire disclosures of the above applications are incorporated herein by reference.

FIELD

The invention relates to a method and machining device for clamping and machining a control cabinet component.

BACKGROUND

This section provides background information related to the present disclosure which is not necessarily prior art.

Technologies like this are used to machine workpieces which are configured as control cabinet components. Drill heads or milling heads can be used as machining tools but plasma and laser machining are also options.

The control cabinet component is clamped to a machining device's work surface so that it is securely held in a machining position during the subsequent machining. It is known in the art to use manually adjustable clamping devices to secure the control cabinet component to the work surface.

A device for vertically clamping and stacking piled workpieces can be found in document DE 24 34 026 A1. Clamping claws are in the clamped position on the top area of the pile of workpieces.

In document EP 2 842 686 A1 a clamping device is disclosed, in which a clamping element is swivel mounted on a pivotal axis in such a way that, in the clamped position, the clamping element on the top area of the component to be clamped comes into contact.

A further clamping device is outlined in document IT FI20 090 250 A1.

SUMMARY

This section provides a general summary of the disclosure, and is not a comprehensive disclosure of its full scope or all of its features.

The aim of the invention is to provide a method and a machining device for clamping and machining a control cabinet component, using which the operational handling of a workpiece configured as a control cabinet component is made easier.

One aspect is the creation of a method for clamping and machining a control cabinet component in a machining device. With this method, a workpiece which is configured as a control cabinet component is arranged on a machining device's work surface. The workpiece is clamped to the work surface where a supporting unit, having at least one clamping device arranged thereon, is shifted to an edge of the workpiece using an actuator-driven shifting unit. A clamping element of the at least one clamping device is shifted from a released position to a clamped position when moving the clamping element against the edge of the workpiece, meaning that the clamping element comes to rest at multiple contact points on the workpiece so that the clamping element secures the workpiece in a machining position, preventing it from shifting perpendicularly to the work surface. Next, the workpiece is machined using a machining tool.

Another aspect is the creation of a machining device for clamping and machining a control cabinet component. The processing device has a work surface which is equipped for receiving a workpiece which is configured as a control cabinet component for machining, At least one clamping device which is arranged at a supporting unit and having a clamping element, is envisaged. A machining device shifting unit is provided which shifts or moves the at least one clamping device to different shifting positions relative to the workpiece. During operation, the workpiece is clamped to the work surface and machined using a machining tool. When clamping the workpiece, the supporting unit with the at least one clamping device is shifted to an edge of the workpiece using the shifting unit. The clamping element of the at least one clamping device is shifted from a released position to a clamped position when moving against the edge of the workpiece, meaning that the clamping element comes to rest at multiple contact points on the workpiece so that the clamping element secures the workpiece in a machining position, preventing it from shifting perpendicularly to the work surface. The workpiece can then be machined using a machining tool.

The clamping element of the at least one clamping device is swivel mounted on a pivotal axis. When clamping the workpiece to the work surface, the edge of the workpiece also comes to rest on a proximal section of the clamping element and the clamping element pivots when it continues to be driven along the edge of the workpiece into the clamped position; meaning that a distal section of the clamping element comes to rest on the workpiece, in addition to the proximal section.

A proximal and a distal section are formed on the clamping element on opposite sides of a segment cutout. The segment cutout can be right-angled or acute-angled. The segment cutout can also be a circular segment cutout.

The clamping element can come to rest on one or more of the workpiece's laminar contact surfaces in the clamped position.

The at least one clamping device can have multiple clamping elements which, for example, can be arranged next to each other, perpendicular to the direction of shift towards the workpiece's edge.

The actuator for the shifting unit can be pneumatically and/or electronically operated. A solenoid drive can also be used.

Machining the workpiece, which could be a flat component, for example, using the machining tool can include milling and/or drilling. Alternatively or additionally, machining using a plasma or laser tool head is possible.

The forced shifting of the clamping element from the released position to the clamped position when driving the clamping element towards the edge of the workpiece can only take place due to the clamping element being pressurized by pressing against the edge of the workpiece, meaning it is unaffected by the driving forces from an actuator which support the shifting process.

The supporting unit can be arranged on a guide system which has guide rails on the work surface, for example, in the form of C-rails, which are configured as multi-functional rails, especially in such a way that the guide rails on the work surface area serve in addition for receiving hand clamping devices and/or supporting elements (spacing elements). In the guide rails, which can be embedded into the work surface, hand clamping devices for manually clamping the workpiece to the work surface can be removably arranged. Alternatively or additionally, supporting elements are removably positioned in the guide rails, on which the workpiece lies when it is placed on the work surface for machining.

Securing (fixing) the at least one clamping device in a position when the clamping element is arranged in the clamped position may also be provided. For example, a mechanical fixation of a carriage which is driven along the guide rails and shifted towards the workpiece's edge can take place by clamping the slide in the guide rails.

Using the supporting unit and the clamping device arranged thereon as well as the allocated shifting unit, a clamping system is formed which facilitates clamping the workpiece in a non-manual, mechanical way, wherein manual clamping devices can be provided optionally.

The clamping element can be mounted on the clamping device so that it can freely turn or pivot. The clamping element's proximal section can protrude in the direction of the workpiece when at least one of the clamping devices approaches the workpiece's edge. After the clamping element has been pivoted or turned towards the clamped position, the clamping element's distal section can protrude toward the workpiece relative to the proximal section. The clamping element can be formed as a complete body in this or other embodiments and have a disk shape, for example.

The clamping element can press the workpiece against the work surface in the clamped position.

The workpiece can be a flat control cabinet component, for example, a door element, a wall element, like a side wall or a back wall, or a floor element. But the workpiece can also be an at least partly pre-assembled control cabinet body.

The supporting unit with the at least one clamping device can be shifted vertically using the shifting unit. The supporting unit can be formed in this or another embodiments using one or more rails, along which the at least one or more clamping devices are arranged. The supporting unit can be shifted parallel to the surface area of the work surface.

Multiple clamping devices can be arranged on the supporting unit where the clamping element is shifted from the released position to the clamped position when the workpiece is being clamped. The multiple clamping devices as well as the individual clamping elements can be simultaneously moved towards in the edge of the workpiece. The forced shifting of the clamping elements from the released position to the clamped position can also take place simultaneously. Alternatively, each supporting unit which can be moved against the edge of the workpiece can carry just one clamping device.

The clamping element can independently move itself back to the released position when the at least one clamping device is removed from the workpiece to release it. The clamping element can be prestressed against shifting to the clamped position so that the prestress provided on the clamping element at least partially brings about the shift backwards. Alternatively, the shifting of the clamping element from the clamped position to the released position can result entirely from gravity, for example, a torque created by gravity which is not subject to any other external forces such as a prestress. In another embodiment, the shifting of the clamping element to the released position can be supported by an actuator. When the clamping element is mounted so that it can turn or pivot, it independently shifts itself back to the released position when the at least one clamping device is removed from the workpiece to release it.

Contact areas can be formed between the workpiece's neighboring edges in the clamped position. If the clamping element has been formed with the proximal and distal sections, these can come to rest on the neighboring sections in the edge area, on one of the workpiece's edge areas, for example.

An assembly position for the at least one clamping device can be adjustable on the supporting unit. The at least one clamping device can be able releasable mounted to the supporting unit for this reason, so that the at least one clamping device can at least be moved along the supporting unit when in a released position, in order to then fasten or fix it. For example, the at least one clamping device can be arranged so that it is able to be shifted along a mounting rail. Multiple clamping devices with their respective clamping elements can be placed along the mounting rail so that they are able to be shifted in order to make the clamping system adjustable to variously shaped workpieces.

The workpiece can be arranged on and clamped to an upright work surface. For example, a flat control cabinet component can be machined in an upright position, a door or a floor element for instance.

Using the shifting unit, the supporting unit with the at least one clamping device can be shifted between shifting positions which are arranged out of people's reach, at a height of at least 200 cm above the machining device's floor space. Alternatively, the shifting positions can be arranged at a height of more than or at least 230 cm.

The shifting unit can be operated using a pneumatic, an electric and/or a solenoid actuator.

In conjunction with the machining device for clamping and machining a control cabinet component, the embodiments previously mentioned in relation to the method can be provided individually or in any combination.

If the clamping element is swivel mounted on a pivotal axis, the axis of rotation can be formed on a fork mount in which the clamping element is arranged. In the same way, such an embodiment can be provided in conjunction with a pivotal axis.

The supporting unit, with the at least one clamping device arranged thereon, as well as the shifting unit, can be detachably mounted onto the work surface.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
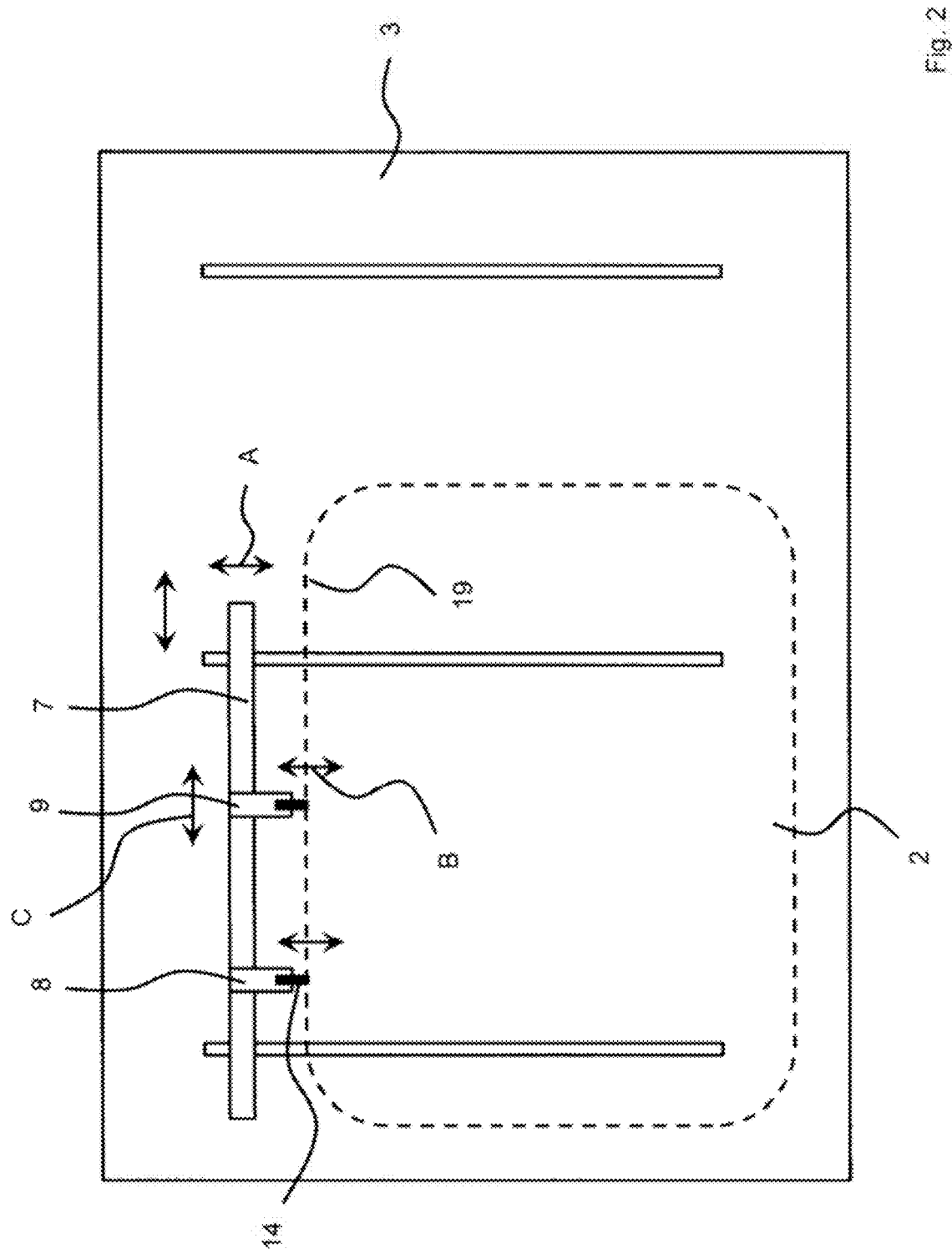
Figure 3:
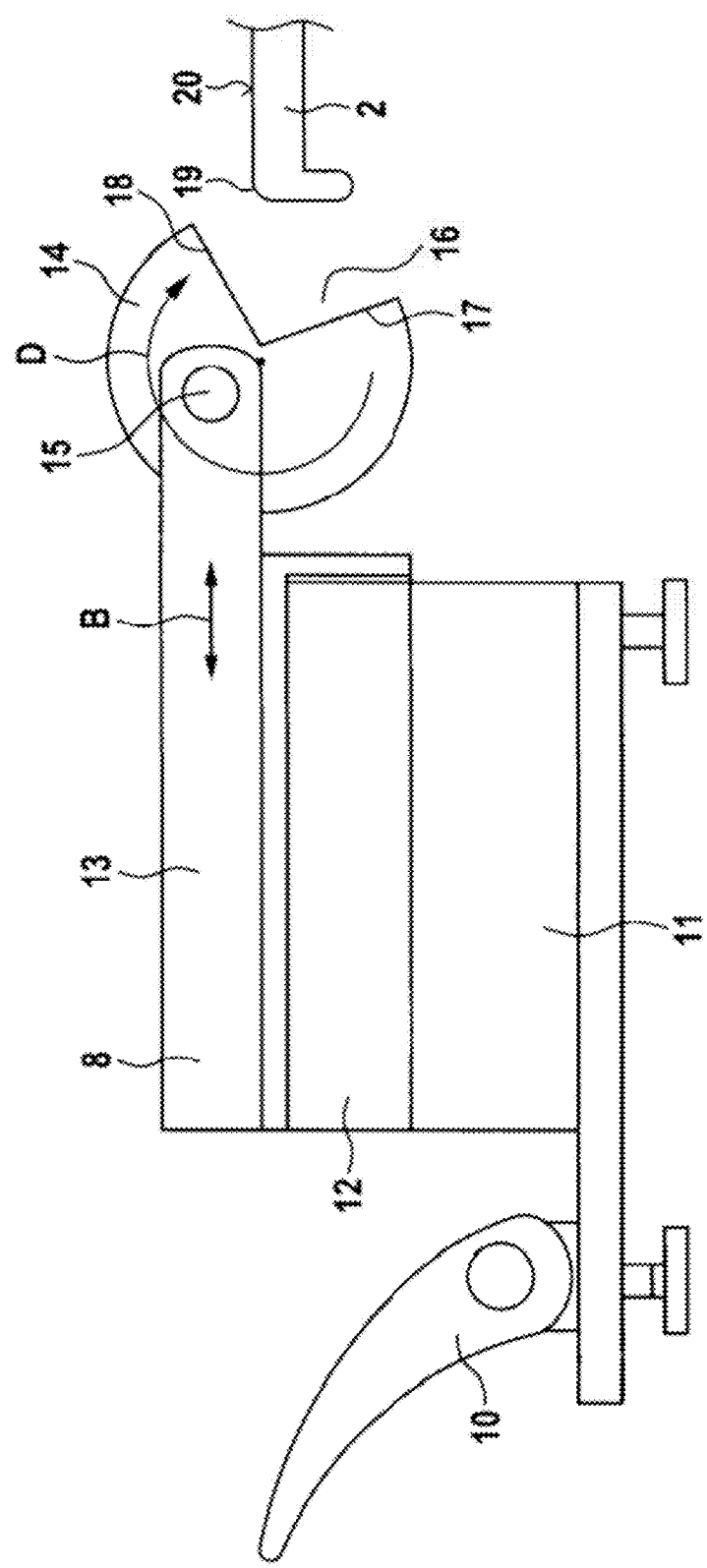

The following is a more precise description of further embodiments which reference figures in a drawing. These are:

FIG. 1 shows a schematic illustration of a machining device for clamping and machining a control cabinet component with an upright work surface, FIG. 2 shows a schematic illustration of the upright work surface, FIG. 3 shows a schematic illustration of a clamping device from the side, FIG. 4 shows a schematic illustration of clamping device elements from the side, where a clamping element is spring mounted, FIG. 5 shows a schematic illustration from above of a configuration with a guide rail and a carriage or glide pad arranged therein, and FIG. 6 shows a section of the configuration in FIG. 5.

DETAILED DESCRIPTION

Example embodiments will now be described more fully with reference to the accompanying drawings.

FIG. 1 shows a schematic illustration of a machining device 1 for clamping and machining a control cabinet component 2. The control cabinet component 2 is clamped in a work surface 3 area in order to be machined with a machining tool 4 which may have a laser cutting head, for instance. The work surface 3 is upright in the shown embodiment so that the control cabinet component 2 can be clamped and machined in an upright position. The control cabinet component 2 can be a flat component, such as a mounting plate, a door or a side wall for the control cabinet which is being made.

In the work surface 3 area, the control cabinet component 2 is arranged on elements 5 which may comprise pins and/or brush strips. By means of the elements 5, the control cabinet component 2 is kept spaced from the surface area and the work surface 3.

There is a clamping system 6 arranged in the top area of the work surface 3, which will be explained later. FIG. 2 shows a schematic illustration of the work surface 3 and FIG. 3 shows a schematic illustration of the clamping system 6 from the side.

The clamping devices 8, 9 are arranged on a mounting rail 7 (see FIG. 2). The clamping devices 8, 9 are removably mounted on the work surface 3 area on the mounting rail 7 by means of a securing device 10 (see FIG. 3). The mounting rail 7 can be shifted vertically relative to the work surface 3 and the control cabinet component 2 which arranged is upon it. A guide carriage system can be used for this, for example, for which a pneumatic, electric or solenoid drive are options for the driving force for shifting the mounting rail 7 with the clamping devices 8, 9 towards and away from the control cabinet component 2. This is indicated in FIG. 2 using arrow A. Alternatively, an extending and contracting supporting arm, which holds the mounting rail 7, can be provided to shift the clamping devices 8, 9 relative to the control cabinet component 2.

According to FIG. 3, the clamping device 8 has a pedestal component 11 and a second shifting unit 12 arranged thereupon which carries a holding device 13, upon which a clamping element 14 is pivoted/swivel mounted on a rotation or pivotal axis 15. The shifting unit 12 is provided in addition to the shifting unit for the mounting rail shown in the embodiment in FIG. 3 with which the mounting rail 7 with the clamping devices 8, 9 is shifted. In an alternative embodiment, the shifting unit 12 is not included or only shifts the clamping element 14 to make it clamp and release.

The clamping element 14 has a circular segment cutout 16 on which a proximal section 17 and a distal section 18 are formed. The clamping element 14 is arranged opposite an edge 19 of the control cabinet component 2 according to FIG. 3. FIG. 3 shows the clamping element 14 in a released position, meaning it is spaced out and not touching the edge 19.

In order to clamp the control cabinet component 2, the mounting rail 7 with the clamping devices 8, 9 and therefore the clamping element 14 is moved towards the edge 19 so that the edge 19 comes into contact with the proximal section 17, resulting in the clamping element 14 rotating or swiveling on the axis 15 (see arrow D in FIG. 3) in order to bring the distal section 18 into contact with the control cabinet component 2 in the surface area of a component 20.

If the control cabinet component 2 is to be released after being machined, the mounting rail 7 with the clamping devices 8, 9 and therefore the clamping element 14 is moved away from the edge 19 by means of the shifting unit actuating the mounting rail 7, whereupon the clamping element 14 rotates/swivels itself back into the released position show in FIG. 3 using gravity.

In the shown embodiment, the relevant clamping element 14 for the clamping devices 8, 9 can be driven along a linear axis (arrow B) against the edge 19 of the control cabinet component 2 from above by means of the second shifting unit 12 for clamping, optionally in addition to shifting unit for the mounting rail 7.

The clamping devices 8, 9 are shiftably mounted on the mounting rail 7, which is schematically shown in FIG. 2 using arrow C.

FIG. 4 shows a schematic illustration of clamping device 40 elements from the side, whereby an allocated, pivotable clamping element 41 is spring mounted by means of a spring device 42 which is formed in the shown embodiment with a spring. When driving towards the edge 19, the clamping element 41 is pressed against the force of the spring device 42, particularly against the direction of approach.

FIGS. 5 and 6 show schematic illustrations of a guide rail 50 configuration from above and in cross-section, which has been configured in the indicated embodiment as a C-rail, with an attached carriage or glide pad 51 which can be shifted along the guide rail 50. In order to secure the carriages' 51 shifting position along the guide rail 50, particularly against slipping, a locking wedge 52 is inserted into a slit opening 53 which has a chamfer 54 so that the carriage or glide pad 51 is stuck in the guide rail 50, whereby the carriage is spread by the locking wedge 52.

The embodiment shown in FIGS. 5 and 6 can be used to receive the mounting rail 7 on the carriage 51. For example, the configuration in FIGS. 5 and 6 can be implemented in the machining device in FIG. 1 by means of the guide rails 3*a* arranged on the work surface 3. The guide rails 3*a* in the embodiment in FIG. 1 are configured as multi-functional rails. The guide rails 3*a* help to shiftably receive the manual clamping elements 3*b*.

The features revealed in the preceding description, claims and drawings can be of significance both individually as well as in any desired combination to realize the different embodiments.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A method for clamping and machining a control cabinet component in a machining device, the method comprising:
arranging a workpiece configured as a control cabinet component on a work surface of a machining device,
clamping the workpiece on the work surface, wherein a mounting rail, with at least one clamping device arranged on it, is shifted toward an edge of the workpiece, and a clamping element of the at least one clamping device is shifted from a released position to a clamped position when guided towards the edge of the workpiece, and machining the workpiece using a machining tool, wherein the mounting rail with the at least one clamping device is shifted to the clamped position at the edge of the workpiece using an actuator-driven first shifting unit, additionally to moving the mounting rail, the clamping element is further driven along a linear axis against the edge of the workpiece by a second shifting unit, in the clamped position, the clamping element comes to rest at multiple contact points on the workpiece so that the clamping element secures the workpiece in a machining position, preventing it from shifting perpendicularly to the work surface, and the clamping element is swivel mounted on a pivotal axis and, when the workpiece is clamped to the work surface, a proximal and a distal section of the clamping element, which are formed on opposite sides of a segment cutout of the clamping element, come to rest on the workpiece in such a way that the edge of the workpiece initially comes to rest in the clamping element's proximal section and the clamping element swivels into the clamped position against the edge of the workpiece, with the clamping element's distal section coming to rest on the workpiece, in addition to the proximal section.

2. The method according to claim 1, wherein the clamping element presses the workpiece against the work surface in the clamped position.

3. The method according to claim 1, wherein the mounting rail with the at least one clamping device is shifted vertically using the first shifting unit.

4. The method according to claim 1, wherein multiple clamping devices are arranged on the mounting rail where the clamping element is shifted from the released position to the clamped position when the workpiece is being clamped.

5. The method according to claim 1, wherein the clamping element independently moves itself back to the released position when the at least one clamping device is removed from the workpiece to release it.

6. The method according to claim 1, wherein contact areas between the workpiece's neighboring edges are formed in the clamped position.

7. The method according to claim 1, wherein a mounting position of the at least one clamping device on the supporting unit is adjustable.

8. The method according to claim 1, wherein the workpiece is arranged and clamped on an upright work surface.

9. The method according to claim 1, wherein the machining device is on a floor space and wherein the first shifting unit is at a height of at least 200 cm above the floor space.

10. The method according to claim 1, wherein the first shifting unit is operated using a pneumatic actuator.

* * * * *